April 11, 1950   J. J. WARDRIP   2,503,529
ARTICULATED FISH LURE
Filed Dec. 5, 1947

Inventor
James J. Wardrip
By Fishburn & Mullendore
Attorneys

Patented Apr. 11, 1950

2,503,529

UNITED STATES PATENT OFFICE 2,503,529

ARTICULATED FISH LURE

James J. Wardrip, Eureka, Kans.

Application December 5, 1947, Serial No. 789,785

2 Claims. (Cl. 43—42.15)

This invention relates to artificial fish lures of the articulated or jointed type and which are used in casting or trolling. In fishing lures of this character the motion producing section is usually pivoted to the preceding section at or ahead of its foremost end and consequently the animation is restricted. It is therefore the principal object of the present invention to provide a structure which better utilizes the effect of the water and produces a more active and vigorous motion.

Further objects of the invention are to provide an articulated fish lure that is of simple and inexpensive construction and which has a tail portion pivotally connected with the oscillating section so as to further enhance the action of the lure.

In accomplishing these and other objects of the invention hereinafter pointed out, I have provided improved structure, the preferred form of which is illustrated in the accompanying drawing wherein.

Figure 1:
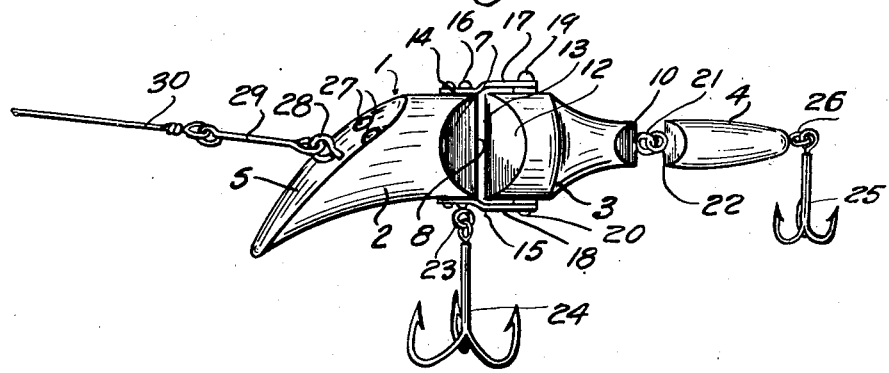
Fig. 1 is a substantially side view of a fish lure embodying the features of the present invention.

Referring more in detail to the drawing:

1 designates a fish lure constructed in accordance with the present invention and which is preferably formed of buoyant sections shaped to provide a head member 2, an intermediate or body member 3 and a tail member 4. The head member 2 is of somewhat circular cross section and curves slightly in a downward direction and the front end has an inclined transversely concaved face 5 which slopes upwardly and rearwardly to effect submergence of the lure. The rear end of the head has inwardly and rearwardly converging faces 6 and 7 that join in a vertical ridge 8 to facilitate movement of water in the space maintained between the members 2 and 3 as later described.

The intermediate member 3 has a front portion 8 of substantially cylindrical formation and tapers rearwardly at the top and bottom to provide a relatively flat rear portion having substantially the width of the front portion. The end of the rear portion is rounded from the sides thereof as at 9 and 10 to permit free swivelling movement of the tail member 4. The front cylindrical portion 8 of the intermediate member has converging slightly concave faces 11 and 12 joining in a ridge 13 that substantially registers with the ridge 8 of the front section when the sections are in longitudinal alignment. The ridge portions, however, are slightly spaced apart. The head section carries upper and lower bracket-like arms 14 and 15 attached to the upper and lower portions of the head by fastening devices 16. The arms have slightly offset rearwardly extending portions 17 and 18 to mount trunnion pins 19 and 20 that project outwardly from the cylindrical portion of the intermediate section, the trunnions being spaced rearwardly from the point or ridge portion 13 and preferably so that the faces 11 and 12 are positioned in front of the pivotal axis of the trunnions and with the pivot point of the trunnions spaced a less distance from the faces 11 and 12 than the spacing from the ridge portion 13 to provide passageway for flow of water therethrough when the body member swings relatively to the head member.

Figure 2:
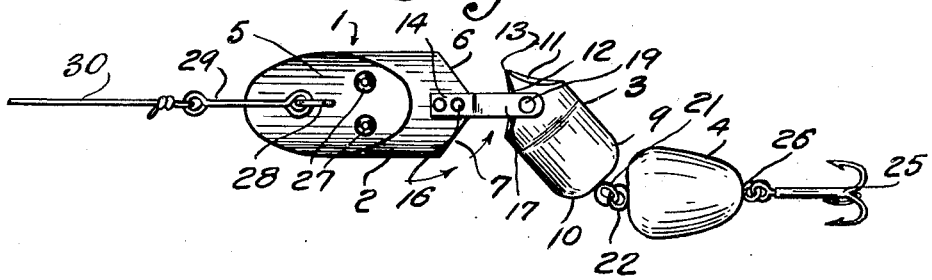
Figs. 2 and 3 are plan views of the lure showing the range of movement in the oscillating sections.

The tail member preferably has a height and width corresponding to the rear portion of the intermediate section and tapers toward the rear end thereof in rounding curves as shown in Figs. 1 and 2. The intermediate and tail members are interconnected by interengaged eyes 21 and 22 that project from adjacent ends of the respective members, the eyes being of suitable size to space the tail member from the intermediate member for giving the desired amount of movement and swivelling action of the tail member. One of the fastening devices for securing the lower bracket 15 may comprise a screw eye 23 that swivelly carries a hook 24 (Fig. 1).

A similar hook 25 is also attached to an eye 26 that projects from the rear end of the tail section. The concave sloping face of the head may be provided with facsimiles of eyes as indicated at 27 and otherwise suitably decorated. The face portion of the head is also provided with a swivel connecting eye 28 for attaching a swivel link 29 to which a line 30 is adapted to be connected.

Figure 3:
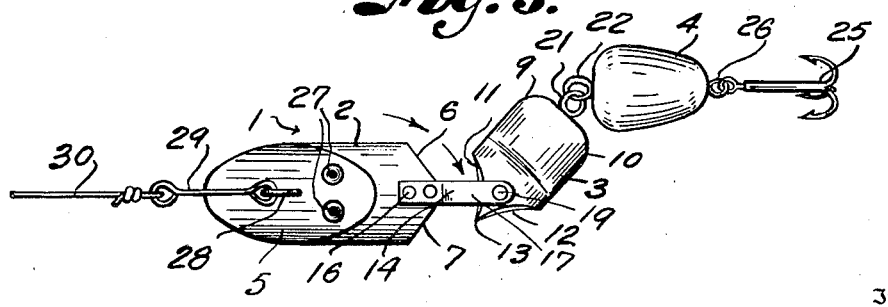

In using the lure, the line is cast as in usual practice and the lure retrieved so that movement of the head member through the water causes the water to move over the rear face portions 6 and 7 and be alternately guided thereby into impinging contact with the curved front faces 11 and 12 of the intermediate member 2 as indicated by the arrows to effect lateral oscillating movement of the intermediate member 2 as shown in Figs. 2 and 3, which movement of the intermediate member 2 causes a lateral swinging movement of the tail member 4 to give an active and live-like movement to the lure. The depth to which the lure submerges in the water may be determined by providing a lure of determinate weight or by regulating the rate of retrievement or the speed to which the lure is drawn through the water.

From the foregoing it is obvious that I have provided a lure having a hinge mounting of the intermediate member with the head member which better utilizes the affect of the water and produce a very active and vigorous action of the intermediate and tail members of the lure.

What I claim and desire to secure by Letters Patent is:

1. A fish lure including a head member having a rear end provided with converging side faces terminating in a substantially vertical ridge at the longitudinal axis of said member, armlike means projecting from the rear of the head member and having rigid support thereon in registry with said ridge, a body member having a front end provided with faces diverging rearwardly from a vertical ridge substantially parallel with the ridge of the head member, and means pivotally connecting the body member to said armlike means at a point offset from the ridge of the body member a distance greater than the distance from said point to a mid-portion of said faces of the body member whereby a passageway is formed between said members for flow of water between corresponding faces on said members when the lure is retrieved through the water for effecting oscillation of the body member relatively to the head member.

2. A fish lure including a head member having a rear end provided with converging side faces terminating in a substantially vertical ridge at the longitudinal axis of said member, an arm projecting from the rear of the head member and having rigid support thereon in registry with said ridge, a body member having a front end provided with faces diverging rearwardly from a vertical ridge substantially parallel with the ridge of the head member, a tail member, a flexible connection between the tail and body members for swinging movement of the tail member relatively to the body member, and means pivotally connecting the body member to said arm at a point offset from the ridge of the body member a distance greater than the distance from said point to a mid-portion of said faces of the body member whereby a passageway is maintained between said members for flow of water between corresponding faces on said members when the lure is retrieved through the water for effecting oscillation of the body and tail members relatively to the head member.

JAMES J. WARDRIP.

REFERENCES CITED

The following references are of record in the file of this patent:

UNITED STATES PATENTS

| Number | Name | Date |
| --- | --- | --- |
| 1,477,756 | Heddon et al. | Dec. 18, 1923 |
| 1,833,522 | Goble | Nov. 24, 1931 |
| 1,892,892 | Jamar, Jr. | Jan. 3, 1933 |
| 2,008,250 | Haas | July 16, 1935 |